United States Patent
Mukhopadhyay et al.

(10) Patent No.: US 11,228,645 B2
(45) Date of Patent: Jan. 18, 2022

(54) DIGITAL TWIN OF IT INFRASTRUCTURE

(71) Applicant: Microsoft Technology Licensing, LLC, Redmond, WA (US)

(72) Inventors: Debasish Mukhopadhyay, Sammamish, WA (US); Prabagaran Santhanakrishnan, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/833,393

(22) Filed: Mar. 27, 2020

(65) Prior Publication Data

US 2021/0306416 A1   Sep. 30, 2021

(51) Int. Cl.
| | |
|---|---|
| G06F 30/20 | (2020.01) |
| G06F 30/13 | (2020.01) |
| G06F 9/54 | (2006.01) |
| G06K 9/62 | (2006.01) |
| G06F 11/36 | (2006.01) |
| H04L 29/08 | (2006.01) |
| H04L 12/24 | (2006.01) |
| G06F 8/60 | (2018.01) |

(52) U.S. Cl.
CPC ............ *H04L 67/1095* (2013.01); *G06F 8/60* (2013.01); *H04L 41/0846* (2013.01); *H04L 41/12* (2013.01); *H04L 41/5051* (2013.01)

(58) Field of Classification Search
CPC . H04L 67/1095; H04L 41/0846; H04L 41/12; H04L 41/5051; G06F 8/60
See application file for complete search history.

(56) References Cited

U.S. PATENT DOCUMENTS

| | | | |
|---|---|---|---|
| 10,326,655 B1* | 6/2019 | Sait | H04L 67/1095 |
| 10,462,009 B1 | 10/2019 | Shiramshetti | |
| 2012/0233118 A1* | 9/2012 | Holt | G06F 16/2219 |
| | | | 707/620 |
| 2016/0048408 A1* | 2/2016 | Madhu | G06F 11/2023 |
| | | | 718/1 |
| 2016/0294800 A1* | 10/2016 | Oppenheim, Jr. | G06F 16/2455 |
| 2018/0322437 A1* | 11/2018 | Mcclory | G06F 8/41 |
| 2019/0121889 A1* | 4/2019 | Gold | G06F 16/2255 |
| 2019/0349428 A1* | 11/2019 | Kovacheva | H04L 67/1095 |
| 2019/0354450 A1* | 11/2019 | Grunwald | G06F 3/0614 |

FOREIGN PATENT DOCUMENTS

WO   2019089443 A1   5/2019

OTHER PUBLICATIONS

"International Search Report and Written Opinion Issued in PCT Application No. PCT/US21/016986", dated May 27, 2021, 14 Pages.

* cited by examiner

*Primary Examiner* — Christopher B Robinson

(57) ABSTRACT

A digital twin of an IT infrastructure is created to identify a group of critical servers (called "base servers") needed to replicate the IT infrastructure in a cloud-computing environment. To identify the correct base servers and their actual server configurations, the IT infrastructure is crawled and various telemetry, connection, and network data is analyzed against data sets of other known servers. The digital twin is created to include these base servers and their particular configurations. Then, the digital twin may be deployed on demand in the cloud-computing environment using executable scripts that mimic the base servers and their particular configurations, creating a replication of the IT infrastructure for various purposes (e.g., redundancy, testing, etc.).

20 Claims, 13 Drawing Sheets

DIGITAL TWIN OF IT INFRASTRUCTURE

BACKGROUND

With the proliferation of digital technology, more and more corporate functionality is being moved into the digital realm. Most corporations today have specialized software to run everything in their businesses from human resources, payroll, enterprise resource planning (ERP), customer relationship management (CRM), Internet of Things (IoT), and line of business applications that, hopefully, help the companies run more efficiently and competitively. Complicating matters is the fact that many companies today internally manage their own information technology (IT) infrastructures, hosting everything from administrative software to business line applications in their own private server networks. Yet, modern software is constantly changing, being updated, replaced, added, and deleted all the time. These software changes need to be tested before fully migrated onto corporate IT servers to assure that they will not cause unintended consequences.

Today, corporate software testing requires in-house IT technicians to have access to sophisticated pre-production testing environments that can mimic the behavior of a main applications that runs a company's business. The infrastructure environment where the main business application runs are commonly referred to as "production" environments. A "pre-production" environment is a twin of the production environment. The technicians may then run software changes (e.g., updates, new programs, etc.) in these pre-production testing environments to see how they perform with the current IT infrastructure. Maintaining an adequate pre-production testing environment is incredibly expensive, often costing about the same price as the production environment itself, because additional hardware and software licenses need to be purchased. For example, if the IT infrastructure has 1,000 employees with licenses to a particular CRM software, an upgrade of that software may require nearly the same number of licenses to test—essentially doubling the cost.

Costs aside, simply maintaining the IT pre-production infrastructure is laborious for IT professionals. They must have knowledge of all relevant servers that are being used in the server graph of the IT infrastructure, which is seldom known to every in-house IT professional. Consequently, building a comprehensive pre-production environment typically takes months to track down the people in the company who know all of the servers in the IT infrastructure to be mimicked. As a result, software changes in the corporate IT environment are very slow to be rolled out, or worse, if they are rolled out to the IT infrastructure without proper testing, they may bring about system shutdowns or other unintended consequences that can be disastrous for the company.

Also, large data centers that are being maintained in a private-cloud infrastructure are vital to business operations. Today, cloud environments may be created using various templatization and standardization products. There were times when companies used to spend over a month to build a medium-sized Hadoop cluster infrastructure. This was extremely complex with terabytes to petabytes of storage, hundreds of compute nodes, network, security protocols and large data sets. Some software companies allow one to create complex cloud infrastructures as a template, cutting down deployment time down to about a week. But that is an eternity in the world of big data, where data centers are often the lifeblood of a business. Going down for even a day may be costly. In the case of disasters, it may take months to rebuild conventional large data centers that are hosted in private server environments.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples disclosed herein are directed to the creation and deployment of a digital twin that may be used to replicate a portion of an IT infrastructure into a cloud-computing environment. To create the digital twin, a service crawls the IT infrastructure to identify and classify the different servers and particular server configurations that are being used by the IT infrastructure. This identification is done using telemetry data, crawling data, and/or server connection data of the IT infrastructure to generate a server graph, which represents interconnections between servers called nodes and the travel paths between nodes called edges. In some embodiments, only specific servers of the IT infrastructure (referred to below as "base servers") are used to build a pre-production environment in the cloud, while other servers of the IT infrastructure that are uncovered are not included. To create the pre-production environment, the base servers are mimicked by creating scripts run in the cloud computing device on demand. These scripts may be deployed at any time to quickly create a replication of the IT infrastructure—or at least a part thereof—for any number of purposes (e.g., testing, redundancy, etc.).

BRIEF DESCRIPTION OF THE DRAWINGS

The disclosed examples are described in detail below with reference to the accompanying drawing figures listed below.

DETAILED DESCRIPTION

Figure 1A:
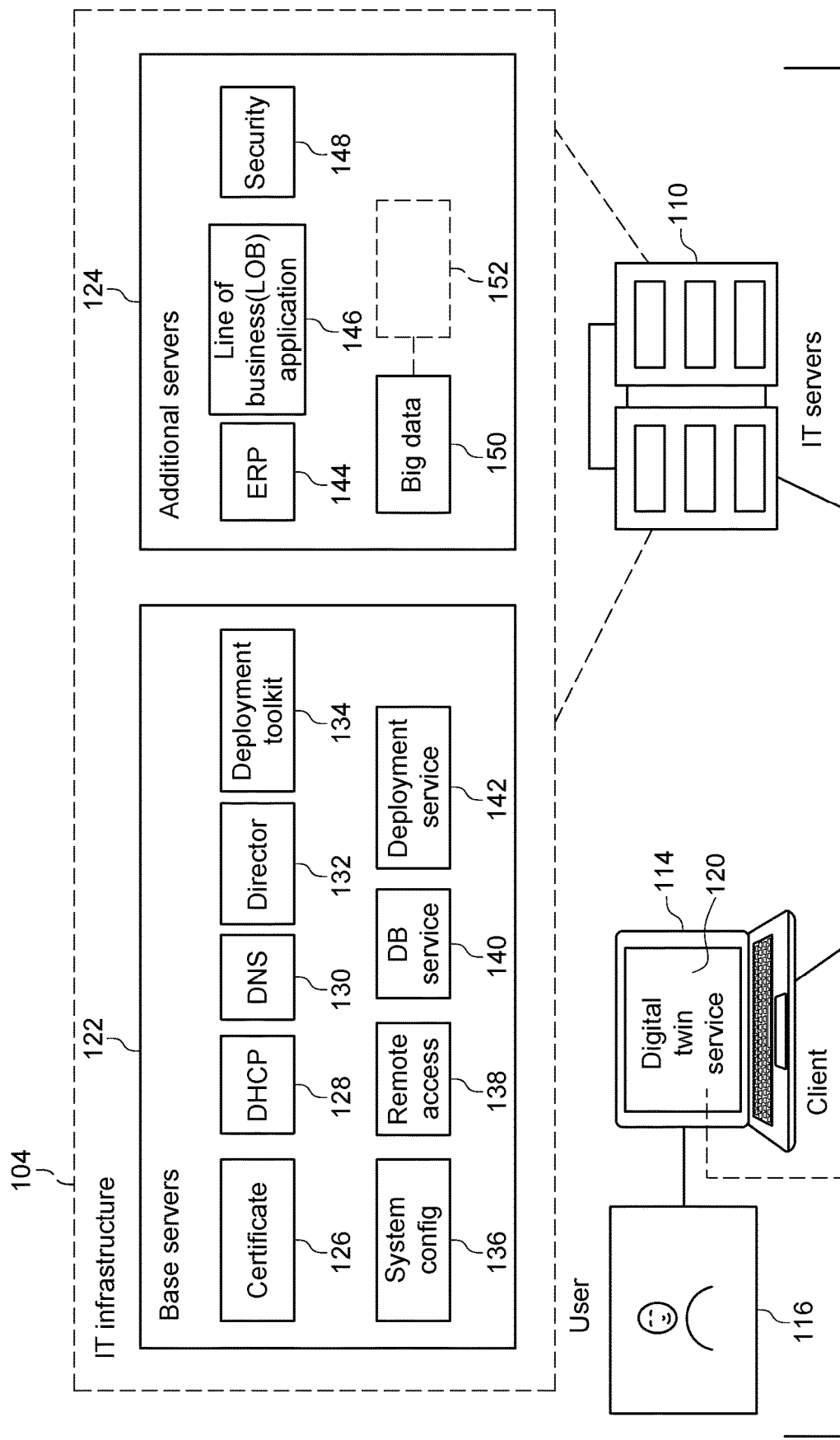
FIGS. 1A-1B illustrate a block drawing of a networking environment for creating a digital twin of the key servers in an IT infrastructure that may be migrated to a cloud environment, according to some embodiments.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

The embodiments and examples herein disclose a "digital twin" that may be used to replicate an IT infrastructure of an organization on demand in a cloud-computing environment. Using the tools disclosed herein, an IT professional may create a digital twin of their IT infrastructure through analyzing and identifying the server graph of the IT infrastructure and then creating corresponding scripts to operate as the different types of servers identified in the identified server graph. These scripts may be run in the cloud, replicating the IT infrastructure and creating a pre-production environment (or sandbox) that allows IT professionals to test different software changes in minutes.

A "digital twin" is a digital replication of one or more server subsystems operating in an IT infrastructure. More specifically, the digital twins include specify the actual server configurations of a specific set of servers that used by the IT infrastructure. Various servers that are included in the digital twin are discussed in more detail below. For example, the digital twin may specify that the IT infrastructure uses particular Domain Name System (DNS) and Dynamic Host Configuration Protocol (DHCP) servers. Once the specific servers are identified and classified in the IT infrastructure, the identified server configurations of these specific servers are included in the digital twin to instruct a cloud-computing environment what servers to mimic or replicate in order to provide a functional equivalency of the IT infrastructure in the cloud for testing, validation, redundancy, and any other purpose.

In addition to the specific servers identified in the IT infrastructure, actual data of those servers may be copied to the cloud and hydrated in the replication of the IT infrastructure that was created using the digital twin. Thus, the digital twin allows for the replication of the IT infrastructure in the cloud, and the data enables developers to either provide a backup for redundancy or disaster-recovery purposes or to test different new or existing changes to software before actually rolling out those changes to the actual IT infrastructure. Effectively, the digital twins discussed herein provide the ability to quickly replicate an equivalent environment to the IT infrastructure in the cloud, test or backup data therein, and then tear down the replicated environment when done.

To allow for quick creation and tear-down, the digital twins discussed herein are stored and processed as scripts that are executable to create the IT infrastructure in the cloud. Storing the digital twins as executable scripts allows the IT infrastructure—or an equivalent thereof—to be recreated on demand by cloud resources. These scripts may be stored in the cloud and accessed whenever developers need to use a pre-production environment. Alternatively or additionally, the scripts may be executed and used to create the IT infrastructure automatically upon occurrence of different conditions, such as, for example but without limitation, a catastrophic event, power outage, or other trigger for backing up the data of the IT infrastructure.

When needed (i.e., on demand), the digital twins are hydrated partially or fully and may be used for any number of purposes. As an example, a company having a partially on-premises IT infrastructure may create a base unit of digital twin for its network and web infrastructure, and then add a new ERP software application (e.g., an SAP® branded application) and another big data software application (e.g., a CLOUDERA® branded application) as submodules of the digital twin. Populating the digital twin with these two submodules and then running the digital twin in a cloud environment allows an IT professional to see how these two new pieces of software will function in the IT infrastructure. Or, in another example, the digital twin base module may be populated with the data from client database upon detection by the IT infrastructure of a system-wide failure, thereby moving the data from current databases to the cloud upon detection of catastrophic events. Depending on the need, the digital twin may be created and populated with different submodules for data, applications, or the like in the cloud very quickly.

Conventional organizations may use the digital twins for a host of purposes, such as validation of software rollouts, security upgrades, or other software changes; migrating entire IT infrastructures to cloud environments from on-premise environments; provide back-up, redundancy, and disaster-recovery services; and the like. As hinted at above, companies typically dread updating their software platforms and applications because they are afraid of potential incompatibility with existing business applications and systems. For example, database upgrades, OS upgrades, application upgrades, and the like may all have unintended consequences if upgraded or moved to the cloud with validation testing. Yet, software providers are constantly pushing updates, and companies are constantly looking for technology that improves their business and security. This puts lot of pressure on the corporate organizations.

The disclosed digital twins mentioned herein provide a tool for IT professionals (and organizations) to test software changes in a safe environment without having to completely duplicate their current production environment, saving considerable processing, manual, and financial resources to develop pre-production, validation, and redundancy cloud environments on demand. Many corporations lack pre-production testing environments that mimic production environments for any sort of experimentation or testing. The digitals twins can also be used during the planning phase of migrating to the cloud, to quickly validate the concept and as well as in resource capacity planning objectives. Additionally, some embodiments offer the digital twins as templates for those looking to move an IT infrastructure to the cloud. In operation, these templates map core environment network components with security and other configuration settings for different industry domains.

To aid the reader, some key definitions are provided below. Some embodiments take the server connection data and generate a "server graph," which is a representation of interconnections between the discovered servers called nodes and the travel paths between nodes called edges. In particular, the server graph is a type of mathematical construct used to determine the server type, where a "distance" between servers, or other machines, is measured by the number of direct connections between machines. For example, if a DNS server is directly connected to a DHCP server, the calculated server distance is one; whereas, servers that have two different nodes between each other may have different calculated server distances.

The IT infrastructure's server graph and types of servers being used are identified from server connection data, telemetry data, and network-crawling data that are gathered by discovery tools disclosed herein. As referenced herein, the "server connection data" refers to the dependency between servers in an IT infrastructure. For example, an IT infrastructure may have a DNS server working with a domain server (or controller) for the DNS server to be working cohesively.

"Telemetry data" refers to the different messages, events, and credentials captured by operating systems (OSes) of end devices and servers, such as, for example, but without limitation, the applications that are running, events that are logged, particular OSes used, transmission protocols, sensor data, or the like. In some embodiments, the telemetry data may include various events from the servers of the IT infrastructure, such as, for example but without limitation, the following:

Microsoft.Windows.Networking.DNS.DnsServerFailureStats,
Microsoft.Windows.IIS.WebSeryer.RunTimeData,
Microsoft.Windows.UBPM.TaskResult, and
Microsoft.Windows.DHCP.Server.DhcpNumV4SrvPolicy "Network-crawling data" refers to the location and network information of the servers in the IT infrastructure. Examples include without limitation, Internet Protocol (IP) addresses, open ports, or traffic information of the servers.

Having generally provided an overview of some of the disclosed examples, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

Figure 1B:
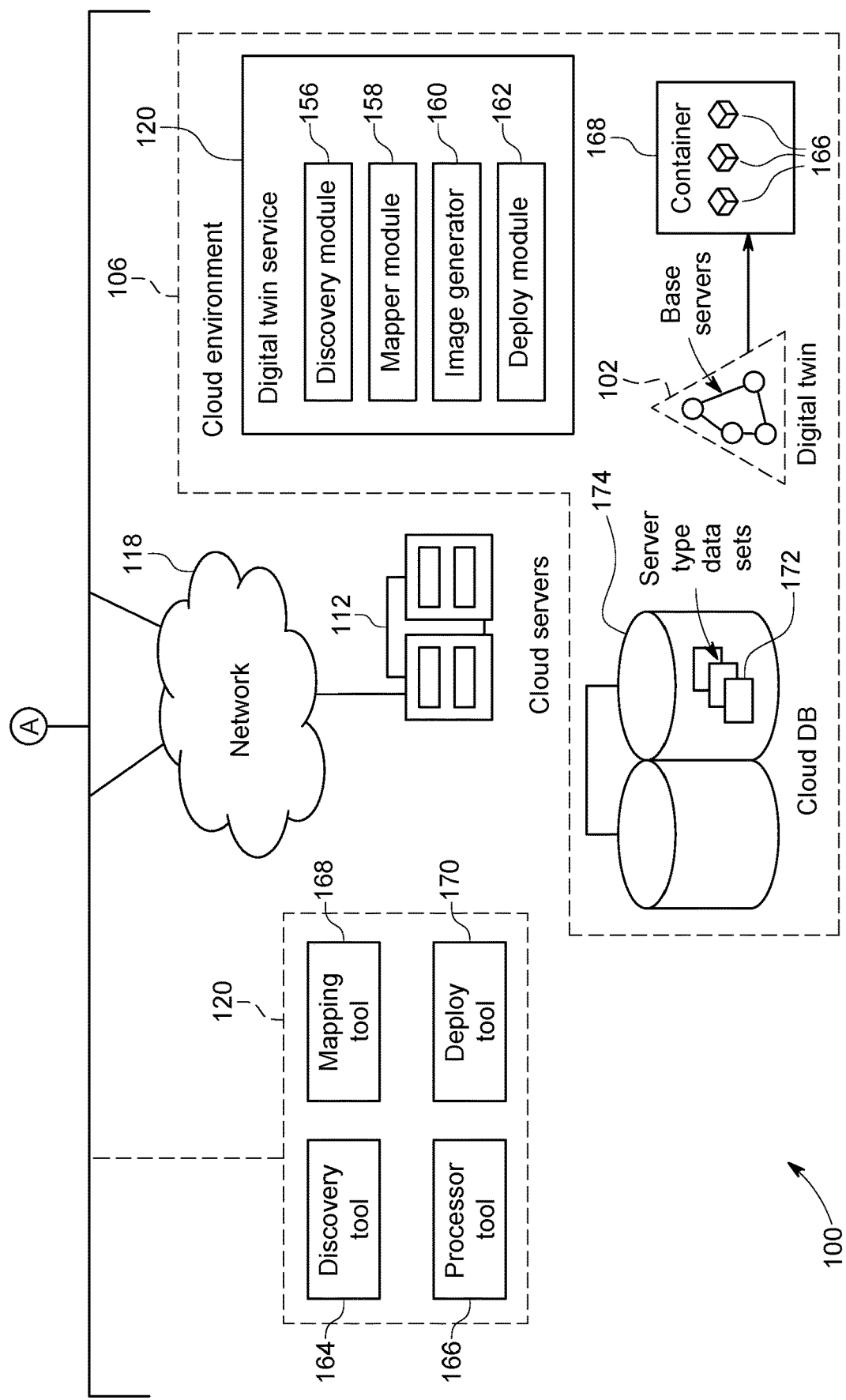

FIGS. 1A-1B illustrate a block drawing of a networking environment 100 for creating a digital twin 102 of the key servers in an IT infrastructure 104 that may be migrated to a cloud-computing environment 106, according to some embodiments. In the shown example, the IT infrastructure 104 is hosted across different IT servers 108. The cloud-computing environment 106 is operated by a collection of cloud servers 112, and may take the form of the example cloud-computing environment shown in FIG. 7. This is but one example. Alternatively, the IT infrastructure 104 may be hosted, wholly or partially, in the cloud as well. Moreover, a client device 114 allows a user 116 to create digital twins 102 using the techniques discussed in more detail below. Functionally, the IT servers 110, cloud servers 112, and client device 114 communicate over a network 118. The networking environment 100 is merely one example of a suitable computing system environment and is not intended to suggest any limitation as to the scope of use or functionality of examples disclosed herein.

The network 118 may include any computer network, for example the Internet, a private network, cellular network, local area network (LAN), wide area network (WAN), or the like. The network 118 may include various network interfaces, adapters, modems, and other networking devices for communicatively connecting the disclosed devices. The network 106 may also include configurations for point-to-point connections. Computer networks are well known to one skilled in the art, and therefore do not need to be discussed at length herein.

The cloud servers 112 represent a collection of servers hosting the cloud-computing environment 106. In some embodiments, the cloud servers 112 include memory and processors programmed to execute a digital twin service 120 that analyzes the IT infrastructure 104 and generates the digital twin 102.

Figure 7:
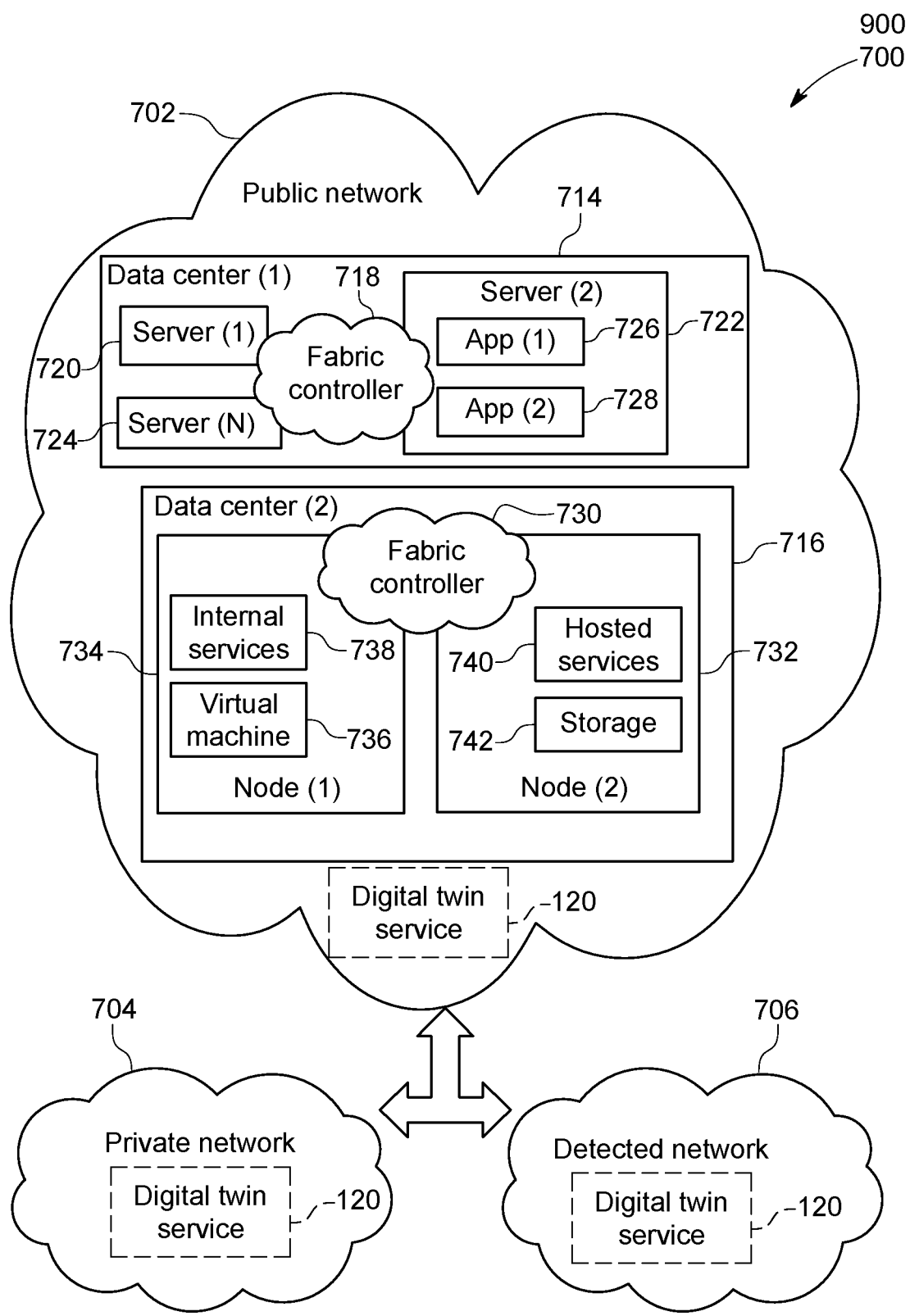
FIG. 7 illustrates a block diagram of one example of a cloud-computing environment, according to some embodiments.

The IT servers 110 represent a collection of servers that include a number of base servers 122, as well additional servers 124, that make the up the IT infrastructure 104. In some embodiments, the IT servers 110 are privately managed by an organization or company. An example cloud-computing environment is illustrated in FIG. 7 and described in more detail below. Alternatively, the IT servers 110 may be hosted in a cloud environment. Thus, the IT servers 110 may be private, hybrid, or public servers hosting the IT infrastructure 104.

In operation, the digital twin 102 of the IT infrastructure 104 is created by analyzing the server connection data, telemetry data, and network-crawling data of the IT infrastructure 104 to identify the base servers 122 it uses. In some embodiments, digital twins are created by the identifying the nine types of servers of the base servers 122. The digital twin 102 provides a listing, or indicates, the specific actual base servers 122 used in the IT infrastructure 104. The "type(s) of server" refers to the role in which the server is operating, and the "specific server(s)" refers to the actual server configuration (e.g., software, OS, or the like).

These roles, and thus types, of the base servers 122 servers, include, for example, a certificate server 126, a DHCP server 128, a DNS server 130, a directory server 132, a deployment toolkit server 134, a system configuration (config) server 136, a remote access server 138, a database server 140, and a deployment service server 142. In some embodiments, the digital twin 102 only includes these nine base servers 126-142, and other servers are not included in the digital twin 102. For example, the additional servers 124 (or others) are not included in the digital twin 102, in some embodiments. The nine base servers 126-142 have shown to be an adequate group of servers that may be used to equivalently mimic the vast majority of IT infrastructures 104. Also, limiting the number of servers that need to be identified in the IT infrastructure 104 significantly reduces the time necessary to create the digital twin 102 through crawling and analyzing its data.

The certificate server 126 is a server role that provides cryptographic keys, digital certificates, authenticodes, and digital signature capabilities for accessing and deploying various IT assets. For example, the certificate server 126 may be Active Directory Certificate Authority Services (AD CS) that operates as an Enterprise Certification Authority (Enterprise CA), issuing authenticode digital certificates for remote access service (RAS), Active Directory authentication, or other access needs across an enterprise. Furthermore, as part of a public key infrastructure, a domain administrator may create an Enterprise CA to manage enterprise-wide authenticode certification of driver packages that are under development.

The DHCP server 128 is a network provides and assigns IP addresses, default gateways and other network parameters to client devices accessing the IT infrastructure 122. In some embodiments, the DHCP server 128 uses the DHCP protocol to broadcast and respond to broadcast queries by client devices. Other embodiments may use different protocols than DHCP, and thus may have a different type of server for assigning IP addresses.

The DNS server 130 is a name server that provides responses to queries against a directory service. In operation, the DNS server 130 translates domain names to IP addresses. Other types of name servers may be used besides those using the DNS protocol. Though, due to the prevalence of the DNS protocol, this server role is called the DNS server 130 for the sake of clarity.

The directory server 132 maintains an authorization directory user profiles for accessing various server assets in the IT infrastructure 104. For example, the directory server 132 may implement the ACTIVE DIRECTORY® branded directory service developed by the MICROSOFT CORPORATION®, headquartered in Redmond, Wash., for its WINDOWS® operating systems. Other types of director services may be used as well, such as, for example but without limitation, Apache Directory, DIRECTORY-AS-A-SERVICE®, Open LDAP, or the like.

The system config server 136 operates as a software management suite of that allows users IT professionals and administrators to manage a large number of connected devices, e.g., client, server, IoT, and the like. For example, the system config server 136 execute MICROSOFT® SYSTEM CENTER CONFIGURATION MANAGER (SCCM), or a similar type of system management software. The system config server 136 may specify various configuration policies, application management, device management, device compliance, enterprise resource access, power management, remote control access, software metering, reporting, addressing queries, USB device management, security policies, OS management, software updates, application delivery, virtual desktop management, endpoint protection, compliance and settings management, and the like. Other configuration features may additionally or alternatively be incorporated.

The deployment toolkit server 134 provides OS deployment for devices in the IT infrastructure. For example, the deployment toolkit server 134 may implement MICROSOFT® DEPLOYMENT TOOLKIT (MDT), which is configured to handle desktop and server deployment through image deployment to various server, client and IoT devices in the IT infrastructure 104. In operation, the deployment toolkit server 134 builds or captures images of an OS for end devices and deploys the images. In some embodiments, the deployment toolkit server 134 deploys all the software intended for installation of end devices, including OS, drivers, updates, and applications in deployment packages. Other deployment toolkits besides MDT may be used as well.

The remote access server 138 specify remote access policies of the IT infrastructure 104. In operation, the remote access server 138 is dedicated to handling devices that are not on a secured or trusted network (e.g., a LAN) but that need remote access to different assets in the IT infrastructure 104. For example, the remote access server 138 allows the users to gain access to files, applications, data, and other devices being managed by the IT infrastructure 104 from remote locations.

The DB service server 140 is the service providing access to one or more databases of the IT infrastructure 104. For example, the DB service server 140 may implement services for SQL Server, owned by the MICROSOFT CORPORATION®. Other database software and related services may be used, such as, for example but without limitation, AMAZON® Aurora, ORACLE® Database, IBM® Cloud Databases, or the like.

The deployment service server 142 functions as a service for implementing the OSes created for deployment by the deployment toolkit 134 across the network 118 to other devices managed by the IT infrastructure 104. Some examples use WINDOWS® Deployment Services (WDS). WDS can handle automated (using scripting files) deployment of OSes, and also offers a pre-boot environment to allow for network target devices to boot a certain OS for imaging (or other) purposes.

In some embodiments, the digital twin 102 specifies the actual configurations of the nine base servers 122. Also, in some embodiments, the digital twin 102 is stored—either in the IT infrastructure 104 or the cloud-computing environment 106—as a collection of executable scripts that may be used for on-demand generation of replica versions (either in partially or wholly) of specific configurations of the base servers 126-142. For example, the digital twin 102 may specify a particular type of DHCP server 128 and a particular type of DNS server 130 that are both translated into scripts executable to recreate such specific server configurations in the cloud-computing environment 106. Additionally or alternatively, some of base servers 122 may be combined and executed by a single server role. For example, the deployment toolkit server 134 and the deployment service server 142 may be combined and operate as a single server. Or operations of the remote access server 138 may be managed by the system config server 136. Various other combinations of the base servers 122 are contemplated herein.

In addition to the base servers 126-142, the IT infrastructure may include various other servers, shown as additional servers 124. These include, for example only, an ERP server 144, one or more line-of-business (LOB) application servers 146, security servers 148, large data servers 150, and other servers that may be specific to the company's business or the IT infrastructure 104 (represented by dotted box 152). In some embodiments, these additional servers 124 are not included in the digital twins discussed herein. Rather, only the base servers 122-142 are included. The core base servers 122-142 have shown to be key in setting up equivalent pre-production environments in today's client-computing environments, and therefore the embodiments focused only on these base servers 122-142 are able to create digital twins 102 that are useful in validating, testing, and backing up virtually any kind of IT assets. Though, data from these various additional servers 144-152 may be transmitted to the cloud-computing environment 106 and hydrated into a created instance of the digital twin 102.

For example, data from a company's ERP server 144 may be copied to instances of ERP applications running in a replicated version of the IT infrastructure 104 that was generated in the cloud-computing environment 106 using the digital twin 102. Again, the digital twin 102 specifies the specific base servers 122 of the IT infrastructure 104 to replicate, and various applications and data from the IT infrastructure 104 may then be copied into that replication of the base servers 122.

In some embodiments, the digital twin service 120 being run in the cloud includes a discovery module 156, a mapper module 158, an image generator module 160, and a deployment module 162. These cloud-centric modules 156-162 may be stored on and deployed across numerous cloud memory storage and processed using various cloud processors. Additionally, various controls are extended to the user 116 in a client-side application of the digital twin service 120. These client-side controls include, in some embodiments, a discovery tool 164, a processor tool 166, a mapping tool 168, and a deployment tool 170. For the sake of clarity, portions of the digital twin service 120 stored on and executed by processors of the client device 114 are referred to herein as "tools," and portions of the digital twin service 120 stored on and executed by processors of the cloud-computing environment 106 are referred to herein as "modules." Yet, the tools are part of the same overall digital twin service 120, just with portions extended to the client device 114 and portions executed in the cloud-computing environment 106.

Looking at the client side first, the discovery tool 164 provides an interactive user interface (UI) to the user 116 that gives the user the option to analyze the IT infrastructure 104. The user 116 may be asked to answer some of basic questions with respect to the server graph, credentials, or the like in the interactive UI that that activates a crawler program to start discovery network assets and data. In some embodiments, the user 116 may import or provide access to the telemetry data of the IT infrastructure 104 through the discovery tool 164. Once an analysis is requested, the discovery module 156 on the backend begins to crawl the IT infrastructure 104 and uncover the server connection data, network-crawling data, and (if not uploaded) the telemetry data. Put another way, the discovery module 156 causes the IT servers 110 to emit critical information about their services.

Once the IT infrastructure 104 is crawled and such data is obtained, the user 116 may use the processing tool 166 to begin classifying, through machine learning, the different server roles and configurations of the uncovered server assets. In some embodiments, such classification is based on the server connection data, network-crawling data, and/or telemetry data that is collected from the IT servers 110 at multiple different levels of telemetry in comparison to host of data sets of other known servers.

To this end, the mapper module 156 runs machine-learning logic to determine the specific roles of the servers in the graph, based on a multitude of data sets (referred to as "the server type data sets" 172) that are stored in backend storage 174 of the cloud-computing environment 106. In some embodiments, the machine-learning logic iteratively attempts to identify the server configurations and roles of the servers in the server graph based on other server connection data, telemetry data, network-crawling data, and/or the server map found in previously analyzed IT infrastructures that have known servers. In other words, the processing module 158 determines whether any data sets have servers handling similar patterns of the retrieved server connection data, telemetry data, and/or network-crawling data of the IT infrastructure 104. Thus, the mapper module 156 identifies the specific servers in the IT infrastructure 102 using data sets of other previously mapped, or known, servers.

In some embodiments, the mapper module 158 creates a server graph representing the various uncovered and learned servers of the IT infrastructure as well as their distances (e.g., number of intervening edges and/or nodes) from each other. In some embodiments, this server graph (and the servers therein) may then be translated into executable scripts representing the IT infrastructure 104. Additionally or alternatively, some embodiments may show a graphical version of the server graph, like the one shown in FIG. 3 below, for display to the user 116 in the mapping tool 168. The mapping tool 168 presents an illustration of the server graph showing the various roles (and/or configurations) of the server nodes and edges that were classified by the mapper module 158 in the cloud, as well the connections therebetween. The user 116 may have options in the mapper tool 168 for changing the classified configurations or removing various servers from the soon-to-be-created digital twin 102.

For the sake of clarity, the server graph comprises the code created to represent the various servers and devices of the IT infrastructure 104 and their respective connections and distances (e.g., first connection, second connection, etc.) between the servers and devices. A "server topology" represents a graphical depiction of the server graph for display to a user.

The image generator 160 uses the server connection data, network-crawling data, and/or telemetry data collected by the discovery module 156 and/or the server graph created by the mapper module 158 to generate executable scripts 166 for replicating the base servers 122 identified in the IT infrastructure 104. In some embodiments, these executable scripts 166 are created and implemented as Docker images that are executable in Docker containers 168. These executable script files 166 represent the digital twin 102 and are executable on demand to create and tear down a replicated version of the IT infrastructure 104. In other words, translating the data and server graph of the IT infrastructure 104 into the executable scripts 166 allows an equivalent of the IT infrastructure 104 to be quickly recreated as well as populated with the actual data (not the server connection data, network-crawling data, and/or telemetry data) of the servers in the IT infrastructure 104. For example, the executable script files 166 may be executed to replicate the IT infrastructure 104 in the Docker containers 168, and actual data of the various programs running in the IT infrastructure 104 may be copied over to the replicated version of the IT infrastructure 104 that was created using the digital twin 102.

The deploy module 162 deploys the containers 168 and script files 166 (e.g., Docker images) of the digital twin 102, either on demand from the user 114 (e.g., for validation or testing) or upon condition (e.g., timeframe for redundancy or event detection for disaster recovery). The user 114 may initiate the deployment of the digital twin 102 on demand using from the client device 114 via different options of the client-side of the digital twin service 120, which are represented as the "deploy tool" 170. In some embodiments, the UI tool 170 allows the user to specify which identified servers in the IT infrastructure 104 to include or not include in a deployed version of the digital twin 102. For example, the user 114 may want to include a first DNS server 130 that is running in the United States instead of a second DNS server 130 that is running in China. The deploy tool user 170 on the client device 114 allows the user 116 to exclude one over the other.

In some embodiments, the IT infrastructure 104 includes a firewall that may be detected and replicated as part of the digital twin 102. Additionally or alternatively, the digital twin 102 may also include basic network, Internet and extranet, gateways, webservers, proxy servers, and network topology needed to provision any hardware inside the firewall 212.

Typically, applications or services within a corporate network are operating and protected within set of firewall configurations. In addition to the server configurations, the digital twin 102 may also identify and replicate firewall settings of the IT infrastructure 104 in the cloud environment 106 as well. For example, a firewall may either limit or allow traffic coming from a set of known IP addresses, and similarly, external traffic may be completely restricted to a database through the firewall settings.

Figure 2A:
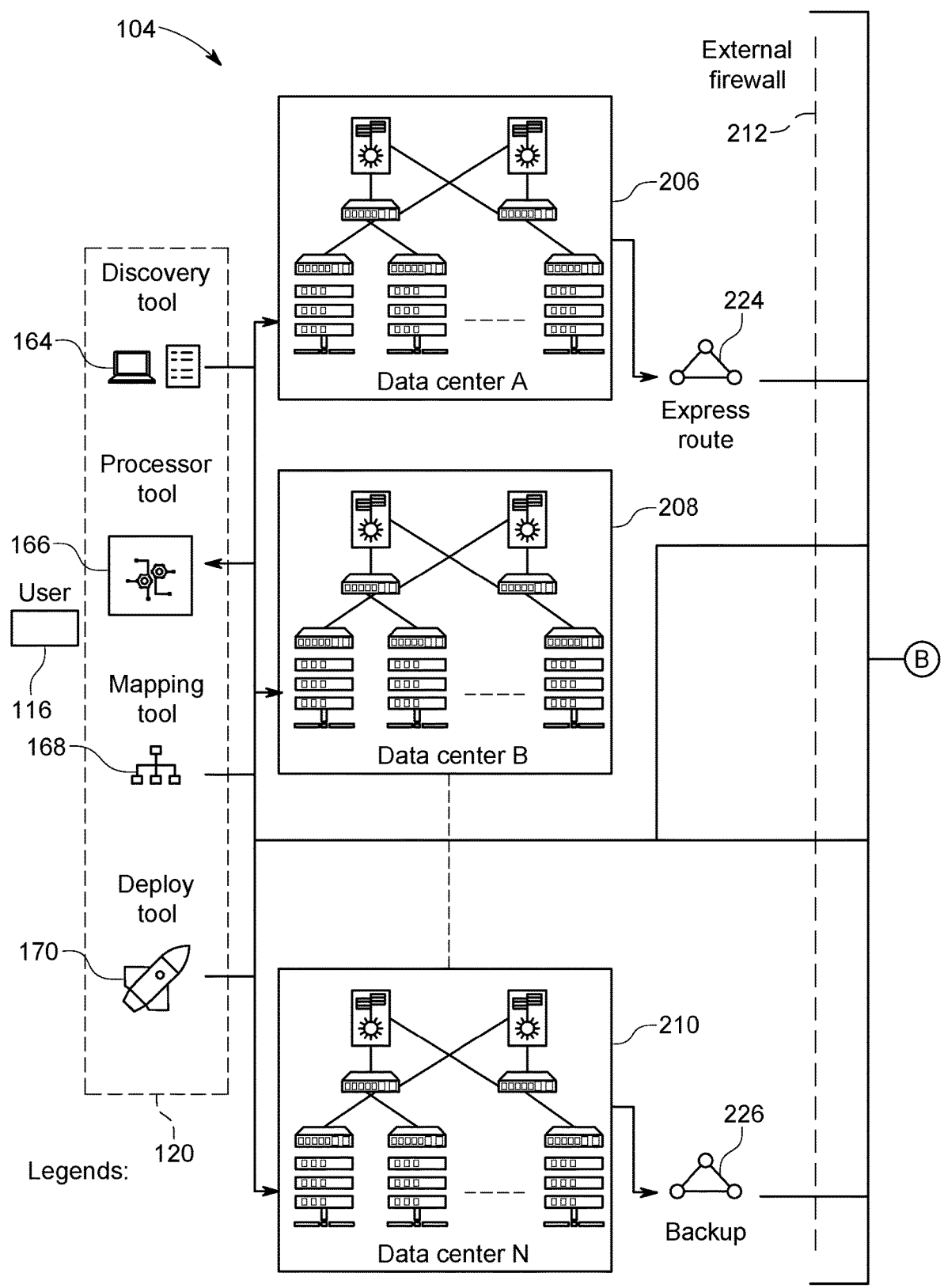
FIGS. 2A-2C illustrate an operational diagram of the IT infrastructure being replicated in the cloud-computing environment using the digital twin, according to some embodiments.
Figure 2B:
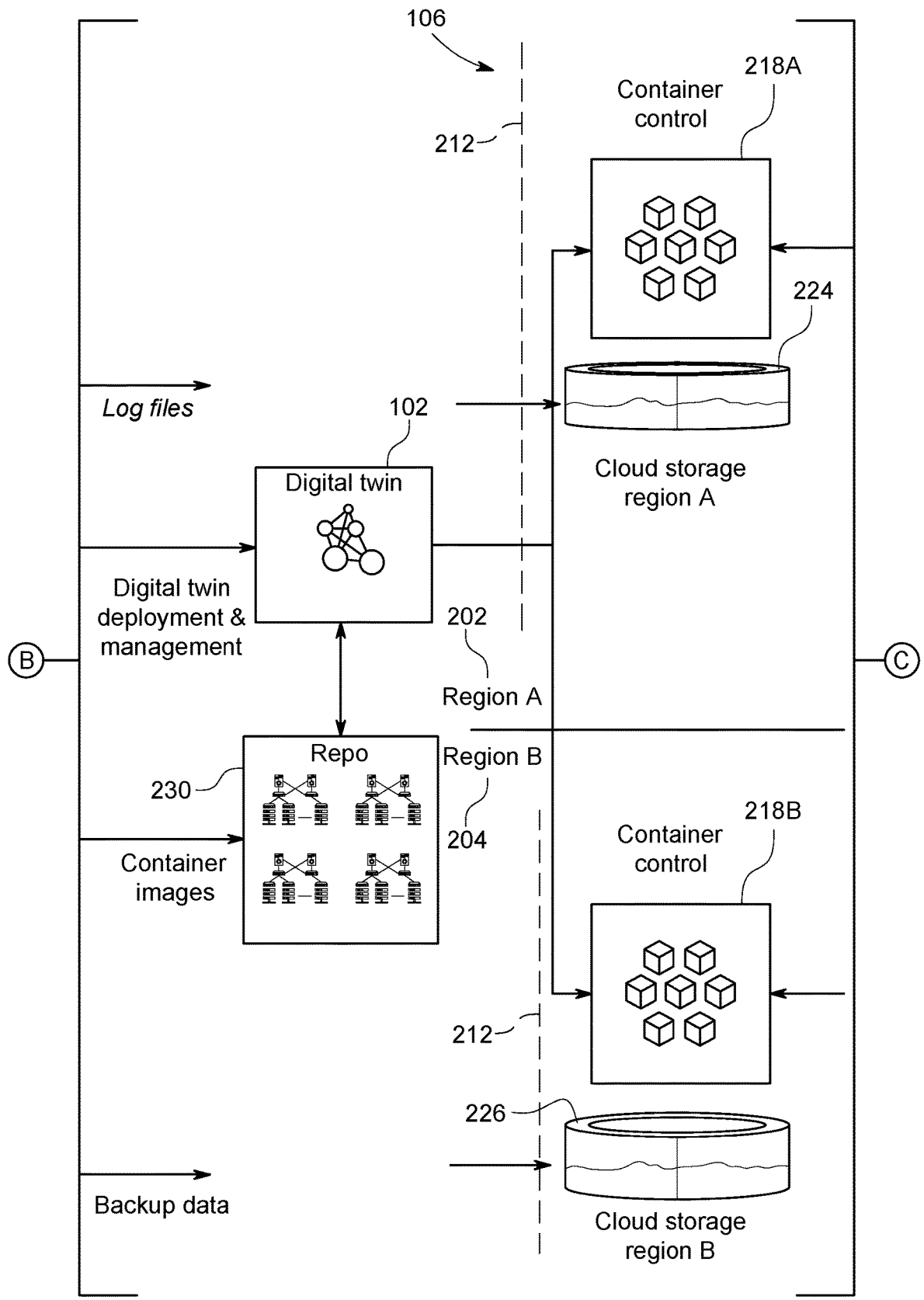
Figure 2C:
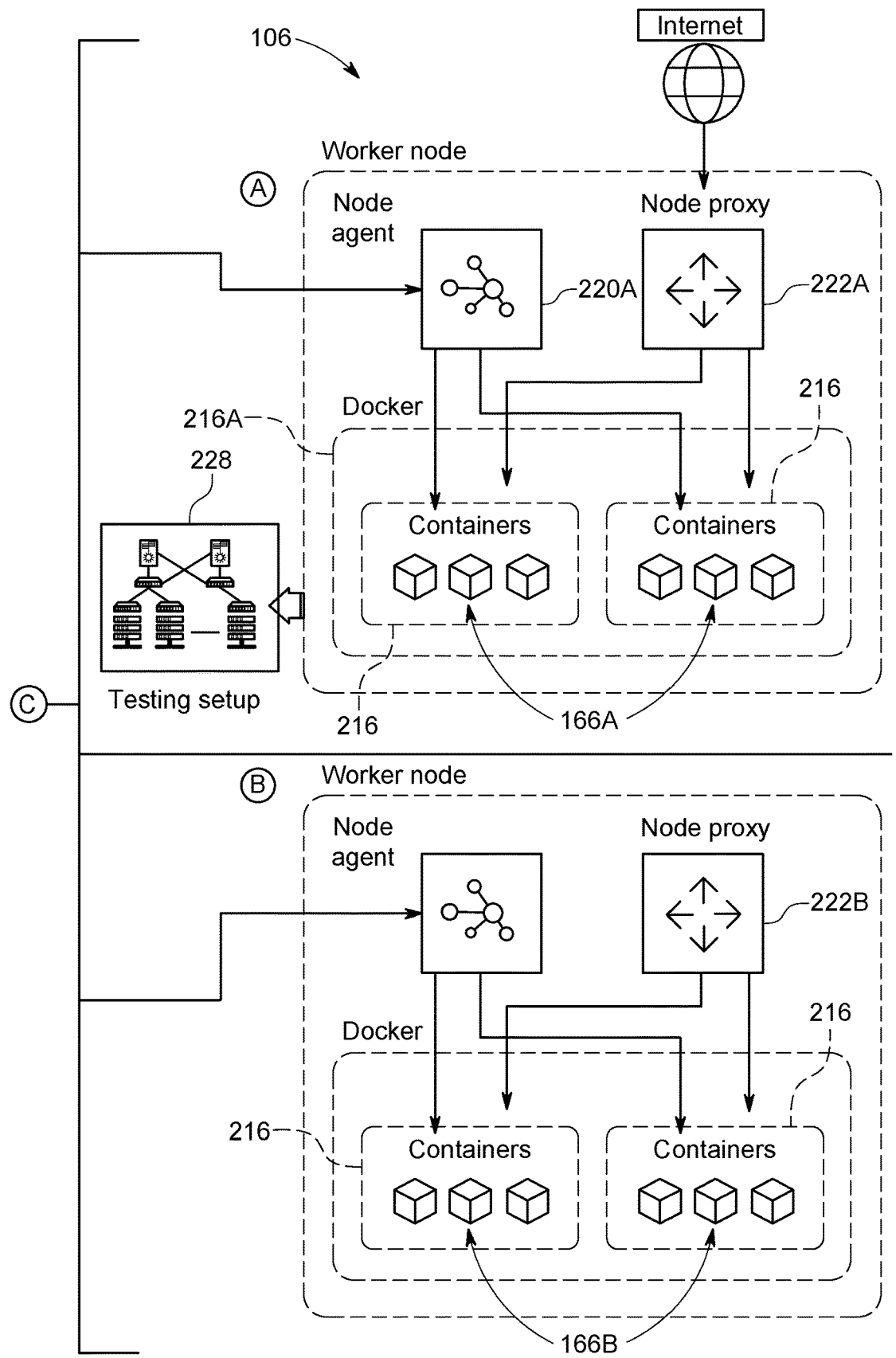

FIGS. 2A-2C illustrate an operational diagram of the IT infrastructure 104 being replicated in the cloud-computing environment 106 using the digital twin 102, according to some embodiments. The digital twin 102 is created using the techniques discussed above. In some embodiments, the client-side UI of the digital twin service 120 allows the user 116 various options and tools 164-170 for initiating creation and deployment of the digital twin 102. The depicted example shows the IT infrastructure 104 having multiple data centers A 206, B 208, and N 210 that are crawled and analyzed to create the digital twin 102 in various cloud regions A 212 an B 214 of the cloud-computing environment 106.

For clarity, FIGS. 2A-2C are shown as different portions of an entire networking configuration, connected by points A, B, and C. To aid the reader, one may connect FIGS. 2A-2C at points A-C to create the entire networking configuration. In particular, FIG. 2A shows the IT infrastructure 104, and FIGS. 2B and 2C show the cloud computing environment 106.

The IT infrastructure 104 includes a firewall 212 that is replicated in the different cloud regions A 202 and B 204. Additionally or alternatively, the digital twin 102 may also include basic network, Internet and extranet, gateways, webservers, proxy servers, and network topology needed to provision any hardware inside the firewall 212.

In some embodiments, the digital tool 102 is deployed in each of the cloud regions A 212 and B 214 as different executable scripts 166A,B within different containers 216. For example, the scripts 166A,B may be Docker image files that are within Docker containers, and that are executable to function like the detected base servers 126-142 of the IT infrastructure 104. In some embodiments, creation of the executable scripts 156A,B and the containers 216 are created on demand and managed by container controls 218A,B respectively operating different node agents 220A,B and node proxies 222A,B. In one particular embodiment, Kubernetes is used to create the executable scripts 156A,B, and Kubernetes controls; agents; and proxies are used to create the container controls 218A,B; node agents 220A,B; and node proxies 222A,B, respectively. Other platforms for managing containers are used in alternative embodiments.

In some embodiments, the executable scripts 156A,B of the digital twin 102 are stored in a repository 230 of the cloud computing environment 106. In some embodiments, repo 230 also stores various infrastructure templates, e.g., scripts of other infrastructures in which the digital twin 102 may be run.

FIGS. 2A-2C show two different use scenarios for creating a replica of the IT infrastructure 104: (1) for testing and validation (referred to as the "testing route" 224)), and (2) for backing up data (referred to as the "backup" 226). Both use scenarios involve using the digital twin 102 to create replications of the IT infrastructure 104.

The depicted embodiment shows the express route being created in server region A, creating replicated testing setup 228 of at least the base servers 126-142 of the IT infrastructure 104 where different software changes (e.g., additions, upgrades, version changes, deletions) may be tested. Results of these changes may then be stored in cloud storage A 224 for the cloud region 212. Various testing scenarios may be run in this testing setup 228, which is a replica of at least a portion of data centers A 206 and B 208. For backup 226, the data center N 210 is copied over to cloud region B 204. In this use scenario, a replicated testing setup may not be monitored like testing setup 216. Instead, portions of the IT infrastructure 104 are replicated in the scripts 166B and backup data of the IT infrastructure 104 are stored in cloud storage B 226 of the cloud region 212. Numerous other use cases scenarios may be carried out.

Figure 3:
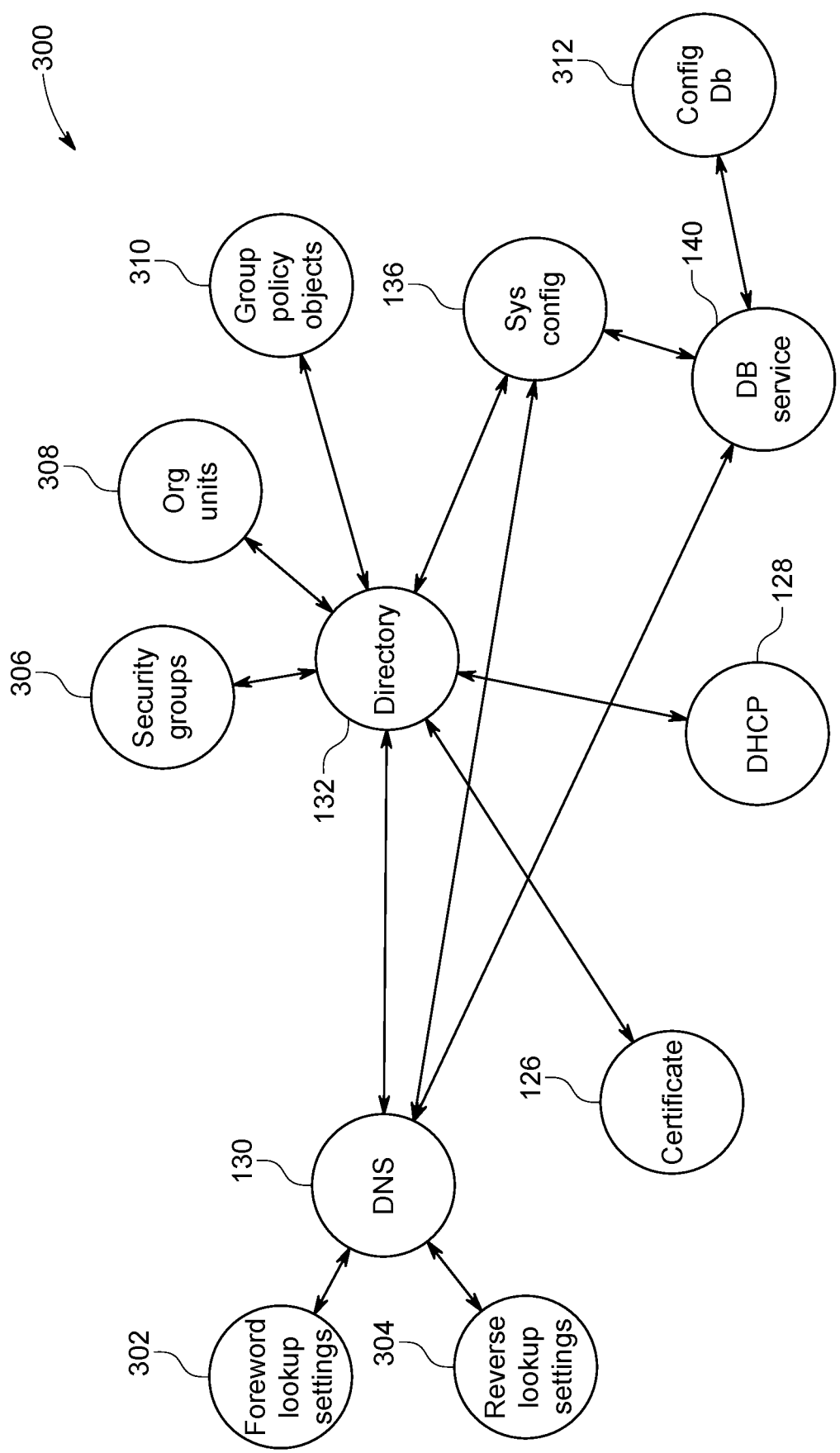
FIG. 3 illustrates a graphical representation of server topology for an IT infrastructure, according to some embodiments.

FIG. 3 illustrates a graphical representation of server topology 300 for an IT infrastructure 104, according to some embodiments. Server topology 300 depicts the server graph representing the connections between various servers in the IT infrastructure 104 that were identified from the server connection data, telemetry data, and network-crawling data. In particular, six of the aforementioned base servers 122 were identified and mapped in the illustrated example: the DNS server 130, the directory server 132, the system config server 136, the DB service server 140, the DHCP server 128, and the certificate server 126. Additional servers 124 beyond the base servers 122 may have been identified by the discovery module 156 but were not included in the server topology 300.

Also, the dependencies of various settings and groups that were uncovered during crawling may be mapped relative to their respective servers. For instance, forward lookup settings 302 and reverse lookup settings 304 for the DNS server 130 are shown mapped to the DNS server 130. Security groups 306, organization (org) units 308, and group policy objects 310 are mapped to the directory server 132. Database configurations (config DB) 312 are mapped to the DB server 140. The dependencies of these different settings relative to their settings may be learned through crawling by the discovery module 156.

Server topology 300 may visually be displayed to the user 116 in the mapping tool 168. Some embodiments allow the user 116 to interact with and change the server topology 300, which in turn changes the digital twin 102. For example, the user may remove any of the servers or settings that are graphed, change setting dependencies, or may add other servers using the mapping tool 168. In other words, the user 116 is allowed to visually see the identified base servers 122 of the IT infrastructure 104 after crawling and make any necessary changes before the digital twin 102 is created.

Figure 4A:
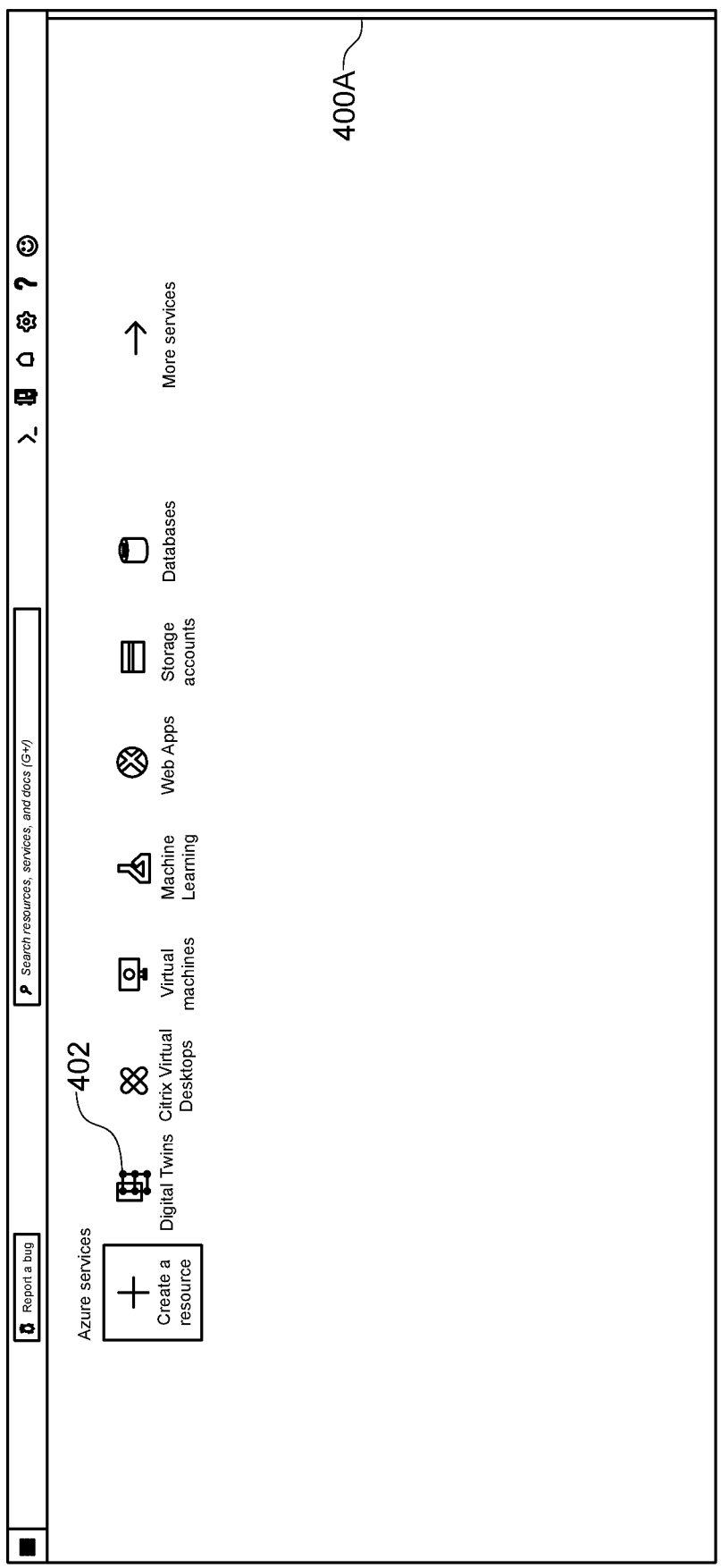
FIGS. 4A-4C illustrate various client-side UIs for operating a digital twin service, according to some embodiments.
Figure 4B:
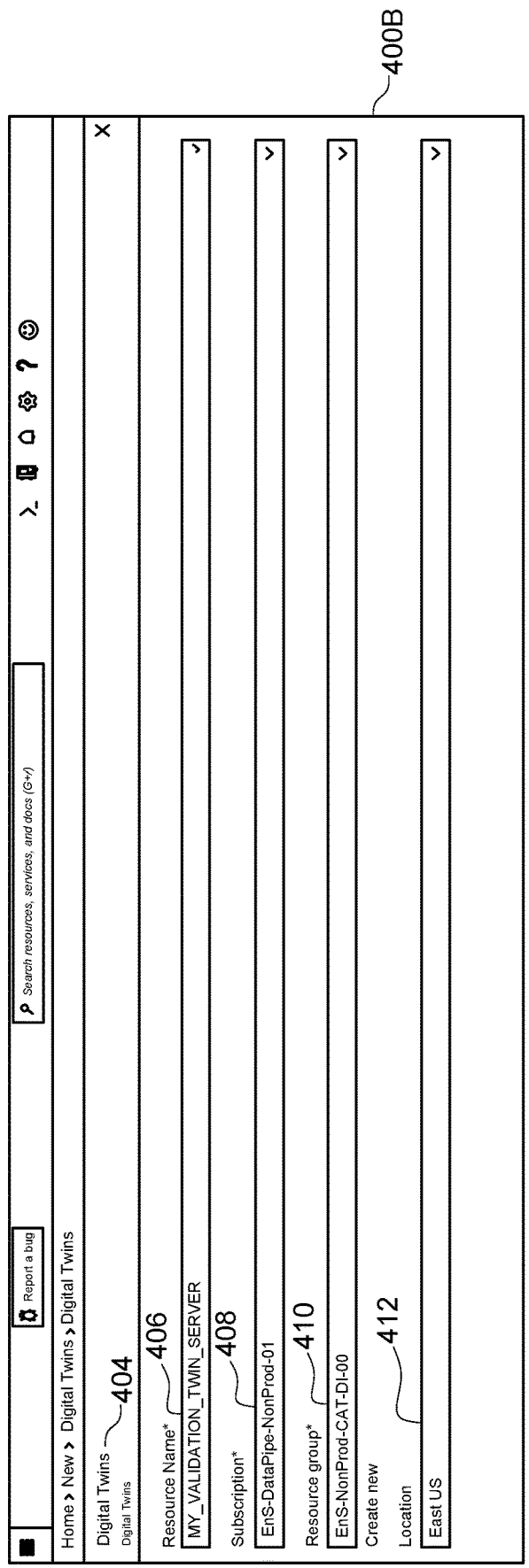
Figure 4C:
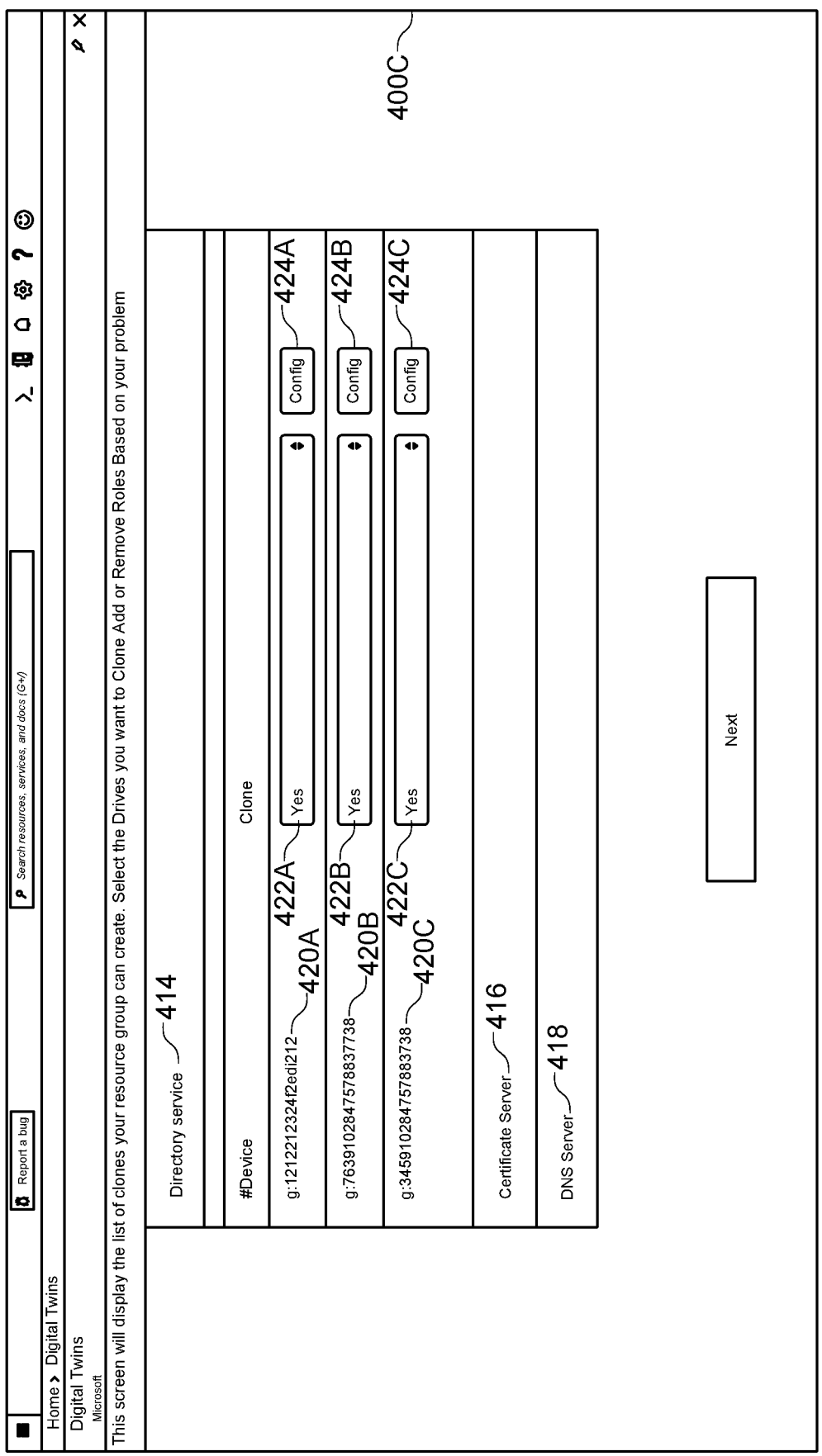

FIGS. 4A-4C illustrate various UI diagrams of the client-side UIs 400A, 400B, and 400C of the digital twin service 120 for creating digital twins, according to some embodiments. As shown in FIG. 4A, the UI 400A provides the user with the option to create digital twins in option 402. Once the user clicks option 402, UI 400B in FIG. B is presented, displaying a digital twin page 404 that allows the user to specify various options for the digital twin being created. For example, the user may add a resource name 406, identify subscriptions 408, indicate resource groups 410, and specify locations 412 for the digital twin.

Once server assets are discovered, the user may designate various configuration data or exclude any particular servers from being included in the digital twin. As shown in FIG. 4C, UI 400C lists some of servers that were identified, e.g., directory server 414, certificate server 416, and DNS server 418. For each type of server, the actual server devices that were found through crawling may be presented as well, as shown by devices 420A, 420B, and 420C. For each server device 420A-C, UI 400C allows the user to designate which ones should be cloned (or replicated) in the digital twin being created. Options 422A-C provide drop-down menus where the user may elect to keep or exclude the various server devices from being replicated. Additional configurations may be specified for each of the server devices 420A-C using buttons 424A-C, respectively. Example configurations include, without limitation, domain controllers, users, user groups, security groups, SCCM groups or policies, or the like.

Figure 5:
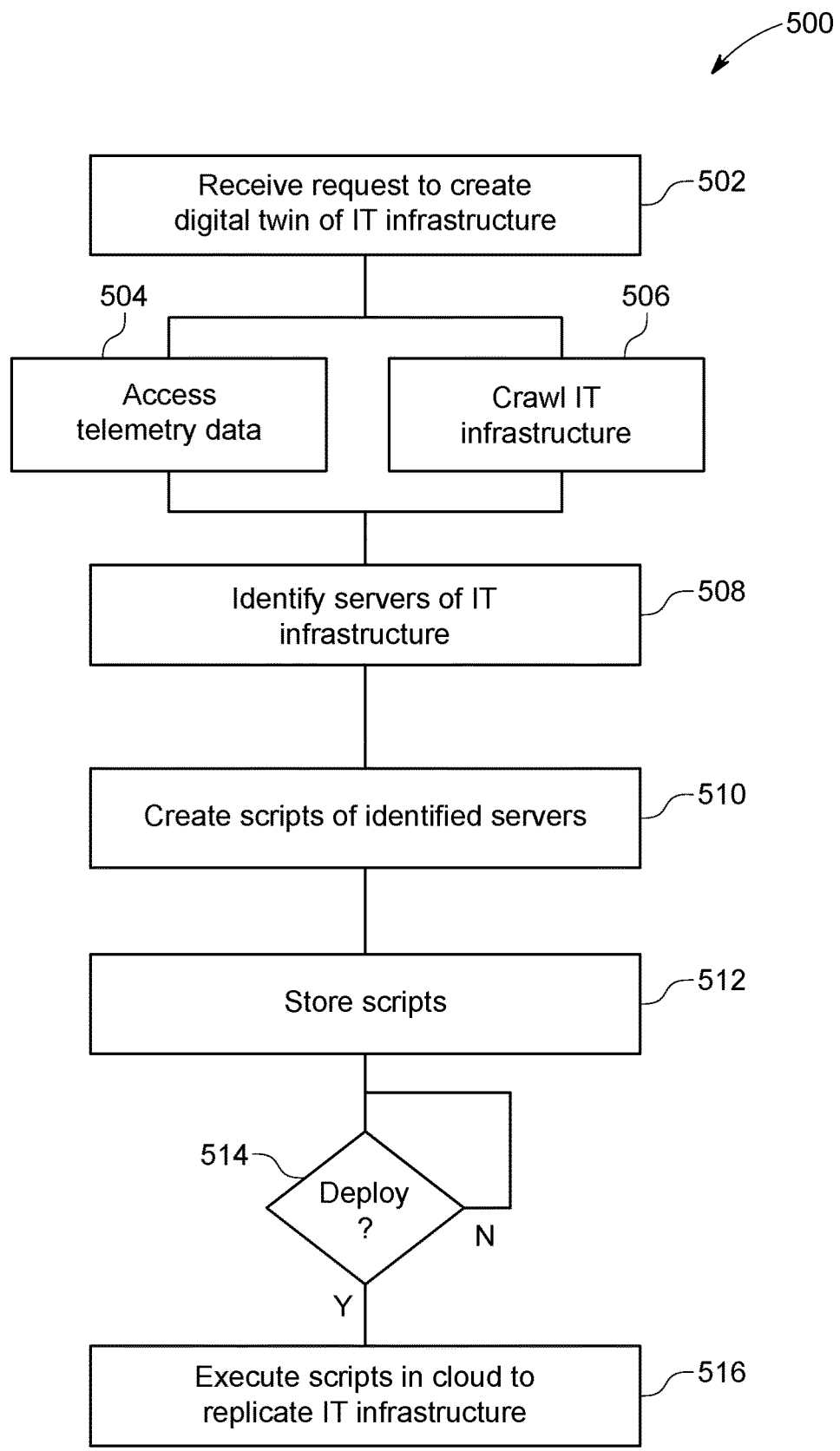
FIG. 5 illustrates a flowchart for creating a digital twin to replicate an IT infrastructure in a cloud-computing environment, according to some embodiments.

FIG. 5 illustrates a flowchart 500 for creating a digital twin to replicate an IT infrastructure in a cloud-computing environment, according to some embodiments. As shown at 502, a request to create the digital twin is received. For example, the user may send such a request using the previously discussed UIs 400A-C. The request triggers a digital twin service to access telemetry data (504) and crawl the IT infrastructure (506). In particular, crawling of the IT infrastructure yields server connection data and network-crawling data that may be analyzed with the telemetry data to identify the various servers of the IT infrastructure, as shown at 508. As previously discussed, servers may be identified by comparing the server connection data, telemetry data, and/or network-crawling data stored data sets of other known server roles and configurations in order to identify the actual server (roles and/or configurations) that are being used by the IT infrastructure. Crucially, the nine base servers mentioned herein, once known, have shown to be enough, in various embodiments, to generate a function replication of the IT infrastructure in the cloud-computing environment.

Once the servers are identified, scripts are created to mimic operations of the servers, as shown at 510. These scripts are stored in the cloud-computing environment for deployment, as shown at 512. The digital twin service may then wait until a request is made to deploy the digital twin and replicate a portion of the IT infrastructure using the stored scripts, as shown at decision box 514. When such a request is received, the scripts of the servers are executed (e.g., Docker images within Docker containers) in the cloud-computing infrastructure, as shown at 516, providing a pre-production or backup of the IT infrastructure very quickly.

Figure 6:
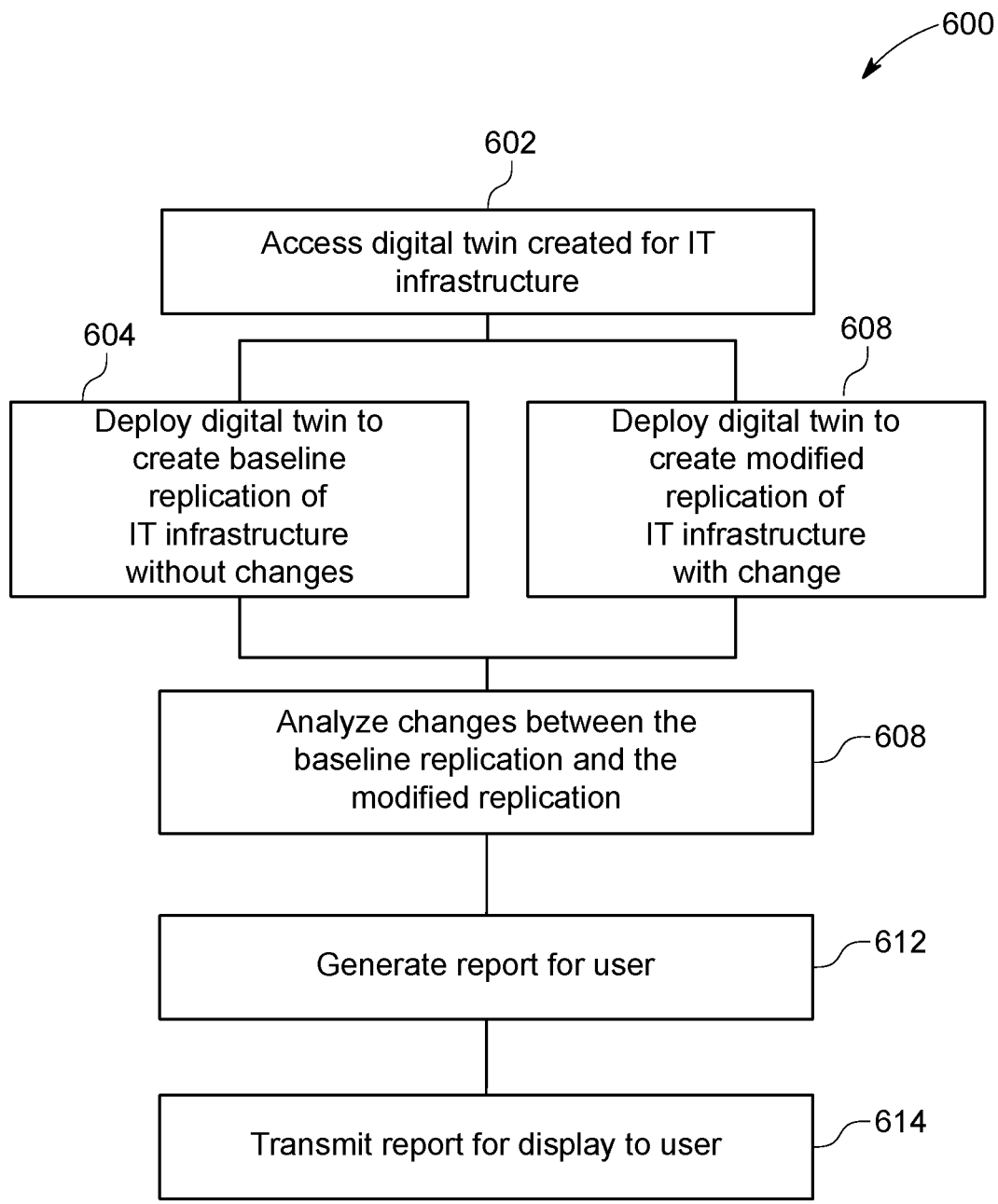
FIG. 6 illustrates a flowchart for deploying a digital twin in order to test how changes to a software application affect the IT infrastructure, according to some embodiments.

FIG. 6 illustrates a flowchart 600 for deploying a digital twin in order to test how changes to a software application affect the IT infrastructure, according to some embodiments. A digital twin that has been created using the disclosed techniques is accessed, as shown at 602. The digital twin is deployed to create a baseline replication of the IT infrastructure without the change, as shown at 602. This baseline replication of the IT infrastructure may be generated in a first container. The digital twin is also deployed to create a modified replication of the IT infrastructure with the software change implemented, as shown at 606. This modified replication of the IT infrastructure may be generated in a second container. Changes are then recorded between the baseline and modified replications of the IT infrastructures, as shown at 608. In some examples, policy changes (e.g., enable bitlocker) are managed through device specific policy management. These changes may be captured in a report that is prepared for the user, as shown at 610, and the report may be transmitted to the user for display, as shown at 614.

Example Cloud-Computing Environment

FIG. 7 illustrates a block diagram of one example of a cloud-computing environment 700, in accordance with some of the disclosed embodiments. Cloud-computing environment 700 includes a public network 702, a private network 704, and a dedicated network 706. Public network 702 may be a public cloud-based network of computing resources, for example. Private network 704 may be a private enterprise network or private cloud-based network of computing resources. And dedicated network 706 may be a third-party network or dedicated cloud-based network of computing resources. In some examples, the digital twin service 120 disclosed herein, and shown in FIGS. 1-4C, may be hosted on either public network 702, private network 704, and/or dedicated network 706. To illustrate this point, digital twin service 120 discussed herein is shown as being implementable in either the public network 702, private network 704, and/or dedicated network 706.

Hybrid cloud 708 may include any combination of public network 702, private network 704, and dedicated network 706. For example, dedicated network 706 may be optional, with hybrid cloud 708 comprised of public network 702 and private network 704. Along these lines, some cloud customers may opt to only host a portion of their customer data (not shown) in the public network 702 and/or dedicated network 706, retaining some of the customers' data or hosting of customer services in the private network 704. For example, a customer that manages healthcare data or stock brokerage accounts may elect or be required to maintain various controls over the dissemination of healthcare or account data stored in its data center or the applications processing such data (e.g., software for reading radiology scans, trading stocks, etc.). Myriad other scenarios exist whereby customers may desire or need to keep certain portions of data centers under the customers' own management. Thus, in some examples, customer data centers may use a hybrid cloud 708 in which some data storage and processing is performed in the public network 702 while other data storage and processing is performed in the dedicated network 706.

Public network 702 may include data centers configured to host and support operations, including tasks of a distributed application, according to the fabric controller 718. It will be understood and appreciated that data center 714 and data center 716 shown in FIG. 7 are merely examples of suitable implementations for accommodating one or more distributed applications, and are not intended to suggest any limitation as to the scope of use or functionality of examples disclosed herein. Neither should data center 714 and data center 716 be interpreted as having any dependency or requirement related to any single resource, combination of resources, combination of servers (e.g., servers 720 and 724) combination of nodes (e.g., nodes 732 and 734), or a set of application programming interfaces (APIs) to access the resources, servers, and/or nodes.

Data center 714 illustrates a data center comprising a plurality of servers, such as servers 720 and 724. A fabric controller 718 is responsible for automatically managing the servers 720 and 724 and distributing tasks and other resources within the data center 714. By way of example, the fabric controller 718 may rely on a service model (e.g., designed by a customer that owns the distributed application) to provide guidance on how, where, and when to configure server 722 and how, where, and when to place application 726 and application 728 thereon. One or more role instances of a distributed application may be placed on one or more of the servers 720 and 724 of data center 714, where the one or more role instances may represent the portions of software, component programs, or instances of roles that participate in the distributed application. In other examples, one or more of the role instances may represent stored data that are accessible to the distributed application.

Data center 716 illustrates a data center comprising a plurality of nodes, such as node 732 and node 734. One or more virtual machines may run on nodes of data center 716, such as virtual machine 736 of node 734 for example. Although FIG. 7 depicts a single virtual node on a single node of data center 716, any number of virtual nodes may be implemented on any number of nodes of the data center in accordance with illustrative embodiments of the disclosure. Generally, virtual machine 736 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine(s) 736 may include processing capacity, storage locations, and other assets within the data center 716 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 730 is responsible for automatically managing the virtual machines running on the nodes of data center 716 and for placing the role instances and other resources (e.g., software components) within the data center 716. By way of example, the fabric controller 730 may rely on a service model (e.g., designed by a customer that owns the service application) to provide guidance on how, where, and when to configure the virtual machines, such as virtual machine 736, and how, where, and when to place the role instances thereon.

As described above, the virtual machines may be dynamically established and configured within one or more nodes of a data center. As illustrated herein, node 932 and node 734 may be any form of computing devices, such as, for example, a personal computer, a desktop computer, a laptop computer, a mobile device, a consumer electronic device, a server, and like. In one instance, the nodes 732 and 734 host and support the operations of the virtual machine(s) 736, while simultaneously hosting other virtual machines carved out for supporting other tenants of the data center 716, such as internal services 738, hosted services 740, and storage 742. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role of instances that reside on the nodes may be to support operation of service applications, and thus they may be interconnected via APIs. In one instance, one or more of these interconnections may be established via a network cloud, such as public network 702. The network cloud serves to interconnect resources, such as the role instances, which may be distributed across various physical hosts, such as nodes 732 and 734. In addition, the network cloud facilitates communication over channels connecting the role instances of the service applications running in the data center 716. By way of example, the network cloud may include, without limitation, one or more communication networks, such as LANs and/or wide area networks WANs. Such communication networks are commonplace in offices, enterprise-wide computer networks, intranets, and the Internet, and therefore need not be discussed at length herein.

Example Computing Device

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, specialty computing devices, etc. The disclosed examples may also be practiced in distributed computing environments where tasks are performed by remote-processing devices that are linked through a communications network.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media devices and communication media. Computer storage media devices include volatile and nonvolatile, removable and non-removable memory implemented in any method or technology for storage of information such as computer readable instructions, data structures, program modules, or the like. Computer storage media devices are tangible and mutually exclusive to communication media. Computer storage media devices are implemented in hardware and exclude carrier waves and propagated signals. Computer storage media devices for purposes of this disclosure are not signals per se. Example computer storage media devices include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Figure 8:
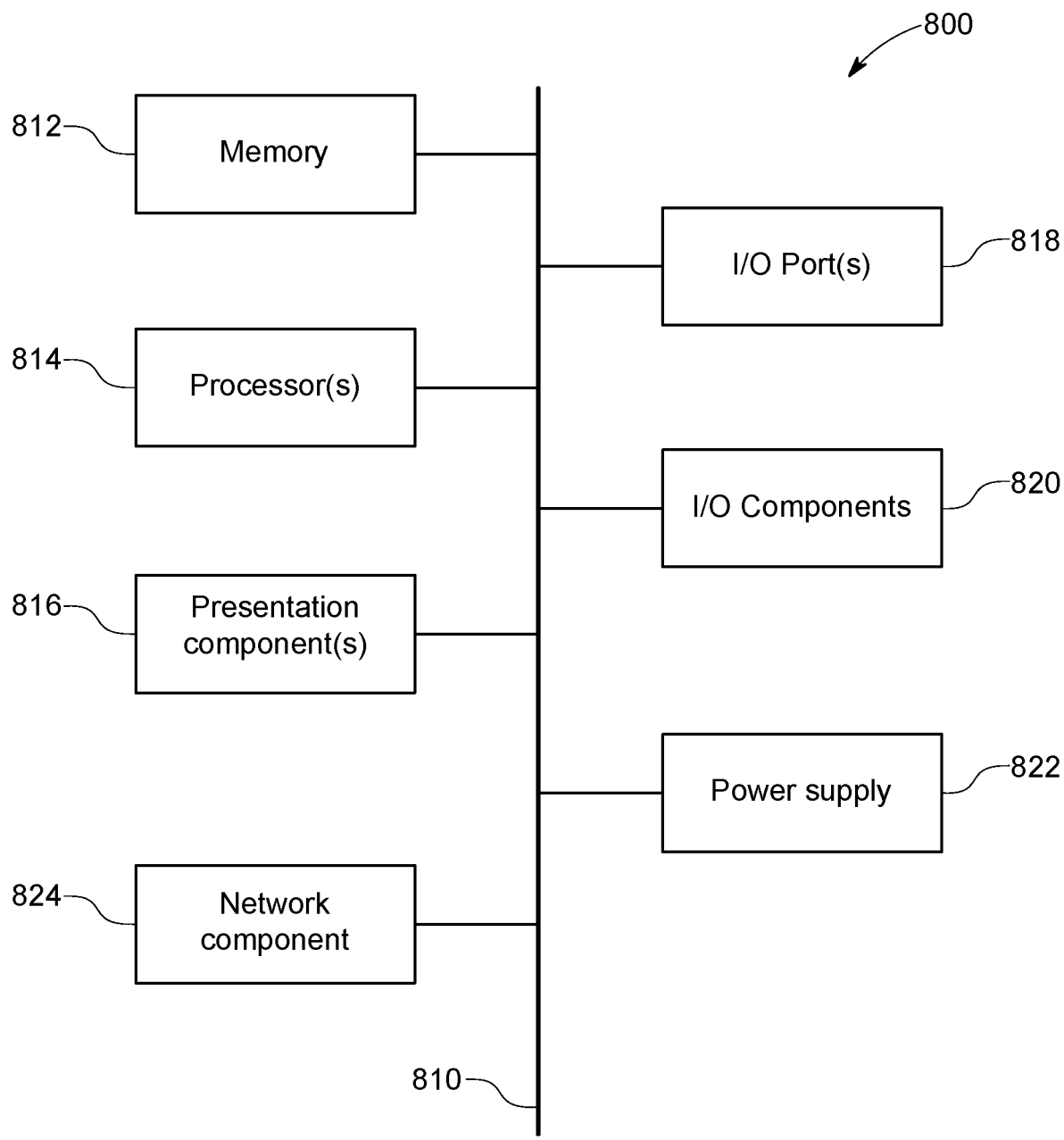
FIG. 8 illustrates a block diagram of an example computing device for implementing, according to some embodiments.

FIG. 8 is a block diagram of an example computing device 800 for implementing aspects disclosed herein, and is designated generally as computing device 800. Computing device 800 is but one example of a suitable computing environment that may be used for the various client computing devices and servers discussed herein. Though, computing device 800 is not intended to suggest any limitation as to the scope of use or functionality of the embodiments disclosed herein. Neither should the computing device 800 be interpreted as having any dependency or requirement relating to any one or combination of components/modules illustrated.

Computing device 800 includes a bus 810 that directly or indirectly couples the following devices: computer-storage memory 812, one or more processors 814, one or more presentation components 816, input/output (I/O) ports 818, I/O components 820, a power supply 822, and a network component 824. Computer device 800 should not be interpreted as having any dependency or requirement related to any single component or combination of components illustrated therein. While computer device 800 is depicted as a seemingly single device, multiple computing devices 800 may work together and share the depicted device resources. For instance, computer-storage memory 812 may be distributed across multiple devices, processor(s) 814 may provide housed on different devices, and so on.

Bus 810 represents what may be one or more busses (such as an address bus, data bus, or a combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 8 is merely illustrative of an exemplary computing device that can be used in connection with one or more disclosed embodiments. Distinction is not made between such categories as "workstation," "server," "laptop," "handheld device," etc., as all are contemplated within the scope of FIG. 10 and the references herein to a "computing device."

Computer-storage memory 812 may take the form of the computer-storage media references below and operatively provide storage of computer-readable instructions, data structures, program modules and other data for the computing device 800. For example, computer-storage memory 812 may store an operating system, a universal application platform, or other program modules and program data. Computer-storage memory 812 may be used to store and access instructions configured to carry out the various operations disclosed herein.

As mentioned below, computer-storage memory 812 may include computer-storage media in the form of volatile and/or nonvolatile memory, removable or non-removable memory, data disks in virtual environments, or a combination thereof. And computer-storage memory 812 may include any quantity of memory associated with or accessible by the display device 800. The memory 812 may be internal to the display device 800 (as shown in FIG. 8), external to the display device 800 (not shown), or both (not shown). Examples of memory 1012 in include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the display device 800. Additionally or alternatively, the computer-storage memory 812 may be distributed across multiple display devices 800, e.g., in a virtualized environment in which instruction processing is carried out on multiple devices 800. For the purposes of this disclosure, "computer storage media," "computer-storage memory," "memory," and "memory devices" are synonymous terms for the computer-storage media 1012, and none of these terms include carrier waves or propagating signaling.

Processor(s) 814 may include any quantity of processing units that read data from various entities, such as memory 812 or I/O components 820. Specifically, processor(s) 814 are programmed to execute computer-executable instructions for implementing aspects of the disclosure. The instructions may be performed by the processor, by multiple processors within the client devices 114 and servers within the cloud-computing environment 106 discussed herein. In some examples, the processor(s) 814 are programmed to execute instructions such as those illustrated in the flowcharts discussed below and depicted in the accompanying drawings. Moreover, in some examples, the processor(s) 814 represent an implementation of analog techniques to perform the operations described herein. For example, the operations may be performed by an analog client computing device 800 and/or a digital client computing device 800.

Presentation component(s) 816 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways.

Ports 818 allow computing device 800 to be logically coupled to other devices including I/O components 820, some of which may be built in. Examples I/O components 1020 include, for example but without limitation, a microphone, joystick, game pad, satellite dish, scanner, printer, wireless device, etc.

The computing device 800 may operate in a networked environment via the network component 824 using logical connections to one or more remote computers. In some examples, the network component 824 includes a network interface card and/or computer-executable instructions (e.g., a driver) for operating the network interface card.

Communication between the computing device 800 and other devices may occur using any protocol or mechanism over any wired or wireless connection. In some examples, the network component 824 is operable to communicate data over public, private, or hybrid (public and private) using a transfer protocol, between devices wirelessly using short range communication technologies (e.g., near-field communication (NFC), Bluetooth™-branded communications, or the like), or a combination thereof.

ADDITIONAL EXAMPLES

Some examples are directed to a method for creating a digital twin of an IT infrastructure for replicating a portion of the IT infrastructure in a cloud-computing environment. The method includes operations for: receiving a request to create the digital twin of the IT infrastructure; accessing telemetry data of the IT infrastructure; crawling the IT infrastructure to identify servers in the IT infrastructure; identifying base servers of the IT infrastructure through comparing the telemetry data with data sets of other identified servers; creating scripts that are executable to function as the base servers; and storing the created scripts in the cloud-computing environment as part of the digital twin. Wherein, the digital twin is executable to create a replicated portion of the IT infrastructure in the cloud-computing environment.

In some embodiments, the digital twin is executable on demand to create the replicated portion of the IT infrastructure.

In some embodiments, the digital twin is deployed in the cloud-computing environment through executing the scripts to function as the base servers.

In some embodiments, the digital twin is deployed in the cloud-computing environment in one or more containers that include image files of the created scripts.

In some embodiments, the image files comprise one or more Docker images.

Some embodiments also populate the created replicated portion of the portion of the IT infrastructure with data of the IT infrastructure.

Some embodiments also include operations for: detecting changes to one or more applications being run in the created replicated portion of the IT infrastructure; and transmitting a report of the detected changes to a client device of a user.

Some embodiments also include operations for executing the scripts of the digital twin to create the replicated portion of the IT infrastructure in the cloud-computing environment on demand incident to a user request.

Some embodiments also include operations for executing the scripts of the digital twin to create the replica portion of the IT infrastructure in the cloud-computing environment on demand to create a backup of data stored in the IT infrastructure.

In some embodiments, the base servers comprise one or more of a certificate server, a DHCP server, a DNS server, a directory server, a deployment toolkit server, a system configuration (config) server, a remote access server, a database server, or a deployment service server.

Some embodiments also include operations for: detecting one or more additional servers that differ from the base servers; and electing not to include the detected one or more additional servers in the digital twin. Such embodiments effectively choose not to add the additional servers beyond the base servers to the digital twin.

Some embodiments also include operations for: generating a server topology that graphically shows the base servers; and transmitting the generated server topology to a client device for display to a user.

Some embodiments also include operations for: deploying the digital twin in the cloud-computing environment to create the replicated portion of the IT infrastructure; receiving a request to test at least one change to an application of the IT infrastructure in the replicated portion of the IT infrastructure deployed in the cloud-computing environment; and deploying the at least one change to the application in the replicated portion of the IT infrastructure deployed in the cloud-computing environment.

Other embodiments are directed to a cloud-computing system for creating a digital twin of an IT infrastructure and replicating a portion of the IT infrastructure. The cloud-computing system includes: cloud memory embodied with instructions for identifying a collection of base servers in the IT infrastructure and generating the digital twin as scripts that are executable to function as the identified collection of base servers; and one or more processors programmed to: receive a request to create the digital twin; access telemetry data of the IT infrastructure; crawl the IT infrastructure to identify the collection of base servers; create scripts that are executable to function as the identified base servers; and store the created scripts in the memory as part of the digital twin. Wherein, the digital twin is executable to create a replicated portion of the IT infrastructure in the cloud memory.

In some embodiments, the base servers comprise one or more of a certificate server, a DHCP server, a DNS server, a directory server, a deployment toolkit server, a system configuration (config) server, a remote access server, a database server, or a deployment service server.

In some embodiments, the base servers comprise a certificate server, a DHCP server, a DNS server, a directory server, a deployment toolkit server, a system configuration (config) server, a remote access server, a database server, and a deployment service server.

In some embodiments, the one or more processors are programmed to deploy the digital twin in the cloud-computing environment through executing the scripts to function as the base servers.

In some embodiments, the digital twin is deployed in the cloud-computing environment in one or more containers that include image files of the created scripts.

Other embodiments are directed to computer-storage memory embodied with computer-executable components for operating a digital twin service configured to create a digital twin of an IT infrastructure for replicating a portion of the IT infrastructure in a cloud-computing environment. The memory includes: a discovery module configured to access telemetry data of the IT infrastructure and crawl the IT infrastructure to identify servers in the IT infrastructure; a mapping module configured to identify base servers of the IT infrastructure through comparing the telemetry data with data sets of other identified servers stored in the cloud-computing environment; an image generator configured to create scripts that are executable to function as the base servers; and a deploy module configured to deploy the scripts for creating a replicated portion of the IT infrastructure in the cloud-computing environment.

In some embodiments, the mapping module is configured to generate a server graph of the base servers for display to a user in in a client-side mapping tool.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for creating a digital twin of an IT infrastructure for replicating a portion of the IT infrastructure in a cloud-computing environment, the method comprising:
receiving a request to create the digital twin of the IT infrastructure;
accessing telemetry data of the IT infrastructure;
crawling the IT infrastructure to identify servers and corresponding server-connection data in the IT infrastructure;
identifying base servers of the IT infrastructure through comparing the telemetry data and server-connection data with data sets of other identified servers from other IT infrastructures;
creating scripts that are executable to function as the base servers;
storing the created scripts in the cloud-computing environment as part of the digital twin, wherein the digital twin is executable to create a replicated portion of the IT infrastructure in the cloud-computing environment; and
deploying the digital twin through running the scripts created to function as the base servers.

2. The method of claim 1, wherein the digital twin is executable on demand to create the replicated portion of the IT infrastructure.

3. The method of claim 1, further comprising:
deploying the digital twin in the cloud-computing environment through executing the scripts to function as the base servers.

4. The method of claim 3, wherein the digital twin is deployed in the cloud-computing environment in one or more containers that include image files of the created scripts.

5. The method of claim 4, further comprising generating a server graph of the base servers, wherein the scripts that are executable to function as the base servers are created based on the server graph.

6. The method of claim 1, further comprising populating the created replicated portion of the portion of the IT infrastructure with data of the IT infrastructure.

7. The method of claim 1, further comprising:
detecting changes to one or more applications being run in the created replicated portion of the IT infrastructure; and
transmitting a report of the detected changes to a client device of a user.

8. The method of claim 1, further comprising executing the scripts of the digital twin to create the replicated portion of the IT infrastructure in the cloud-computing environment on demand incident to a user request.

9. The method of claim 1, further comprising executing the scripts of the digital twin to create the replicated portion of the IT infrastructure in the cloud-computing environment on demand to create a backup of data stored in the IT infrastructure.

10. The method of claim 1, wherein the base servers comprise one or more of a certificate server, a DHCP server, a DNS server, a directory server, a deployment toolkit server, a system configuration (config) server, a remote access server, a database server, or a deployment service server.

11. The method of claim 1, further comprising:
detecting one or more additional servers that differ from the base servers; and
electing not to include the detected one or more additional servers in the digital twin.

12. The method of claim 1, further comprising:
generating a server topology that graphically shows the base servers; and
transmitting the generated server topology to a client device for display to a user.

13. The method of claim 1, further comprising:
deploying the digital twin in the cloud-computing environment to create the replicated portion of the IT infrastructure;
receiving a request to test at least one change to an application of the IT infrastructure in the replicated portion of the IT infrastructure deployed in the cloud-computing environment; and
deploying the at least one change to the application in the replicated portion of the IT infrastructure deployed in the cloud-computing environment.

14. A cloud-computing system for creating a digital twin of an IT infrastructure and replicating a portion of the IT infrastructure, the cloud-computing system comprising:
cloud memory embodied with instructions for identifying a collection of base servers in the IT infrastructure and generating the digital twin as scripts that are executable to function as the identified collection of base servers; and
one or more processors programmed to:
receive a request to create the digital twin;
crawl the IT infrastructure to identify servers and corresponding server-connection data in the IT infrastructure;
compare the server-connection data with other server-connection data for different IT infrastructures that are stored in a backend repository to identify the base servers of the IT infrastructure;
create a server graph of the base servers;
generate scripts, based on the server graph, that are executable to function as the base servers;
store the created scripts in the memory as part of the digital twin, wherein the digital twin is executable to create a replicated portion of the IT infrastructure in the cloud memory, and
deploy the digital twin through running the scripts created to function as the base servers.

15. The cloud-computing system of claim 14, wherein the base servers comprise one or more of a certificate server, a DHCP server, a DNS server, a directory server, a deployment toolkit server, a system configuration (config) server, a remote access server, a database server, or a deployment service server.

16. The cloud-computing system of claim 14, wherein the base servers comprise a certificate server, a DHCP server, a DNS server, a directory server, a deployment toolkit server, a system configuration (config) server, a remote access server, a database server, and a deployment service server.

17. The cloud-computing system of claim 14, wherein the one or more processors are programmed to deploy the digital twin in a cloud-computing environment through executing the scripts to function as the base servers.

18. The cloud-computing system of claim 14, wherein the digital twin is deployed in a cloud-computing environment in one or more containers that include image files of the created scripts.

19. One or more computer-storage memory embodied with computer-executable components for operating a digital twin service configured to create a digital twin of an IT infrastructure for replicating a portion of the IT infrastructure in a cloud-computing environment, one or more computer-storage memory comprising:
- a discovery module configured to access telemetry data of the IT infrastructure and crawl the IT infrastructure to identify servers in the IT infrastructure;
- a mapping module configured to identify base servers of the IT infrastructure through comparing the telemetry data with data sets of other identified servers of other IT infrastructures stored in the cloud-computing environment;
- an image generator configured to create scripts that are executable to function as the base servers; and
- a deploy module configured to deploy the scripts for creating a replicated portion of the IT infrastructure in the cloud-computing environment, wherein deployment is performed through the deploy module creating Docker containers running the scripts to emulate the base servers.

20. The one or more computer-storage memory of claim 19, wherein the mapping module is configured to generate a server topology of the base servers for display to a user in in a client-side mapping tool.

* * * * *